United States Patent Office 3,074,924
Patented Jan. 22, 1963

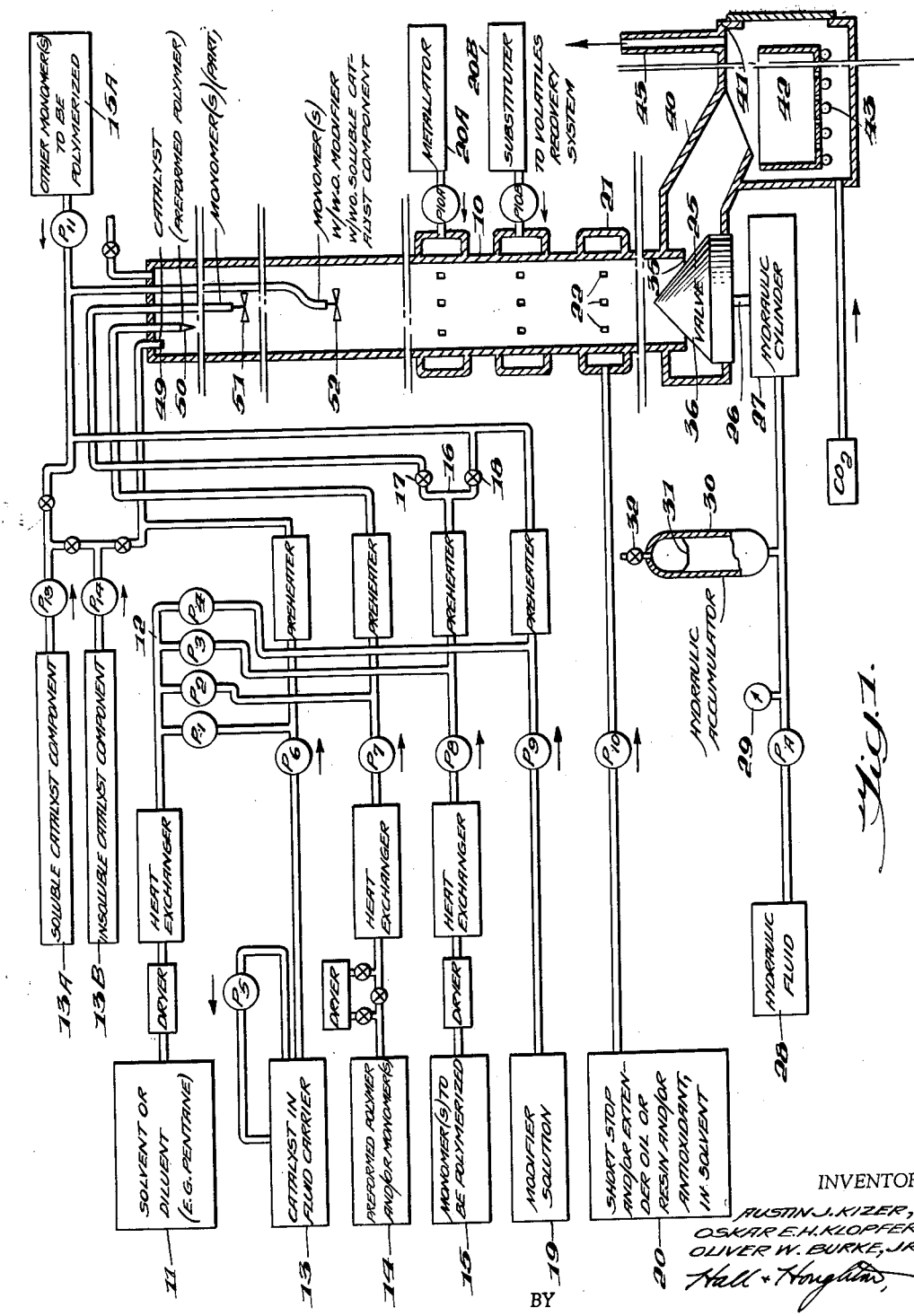

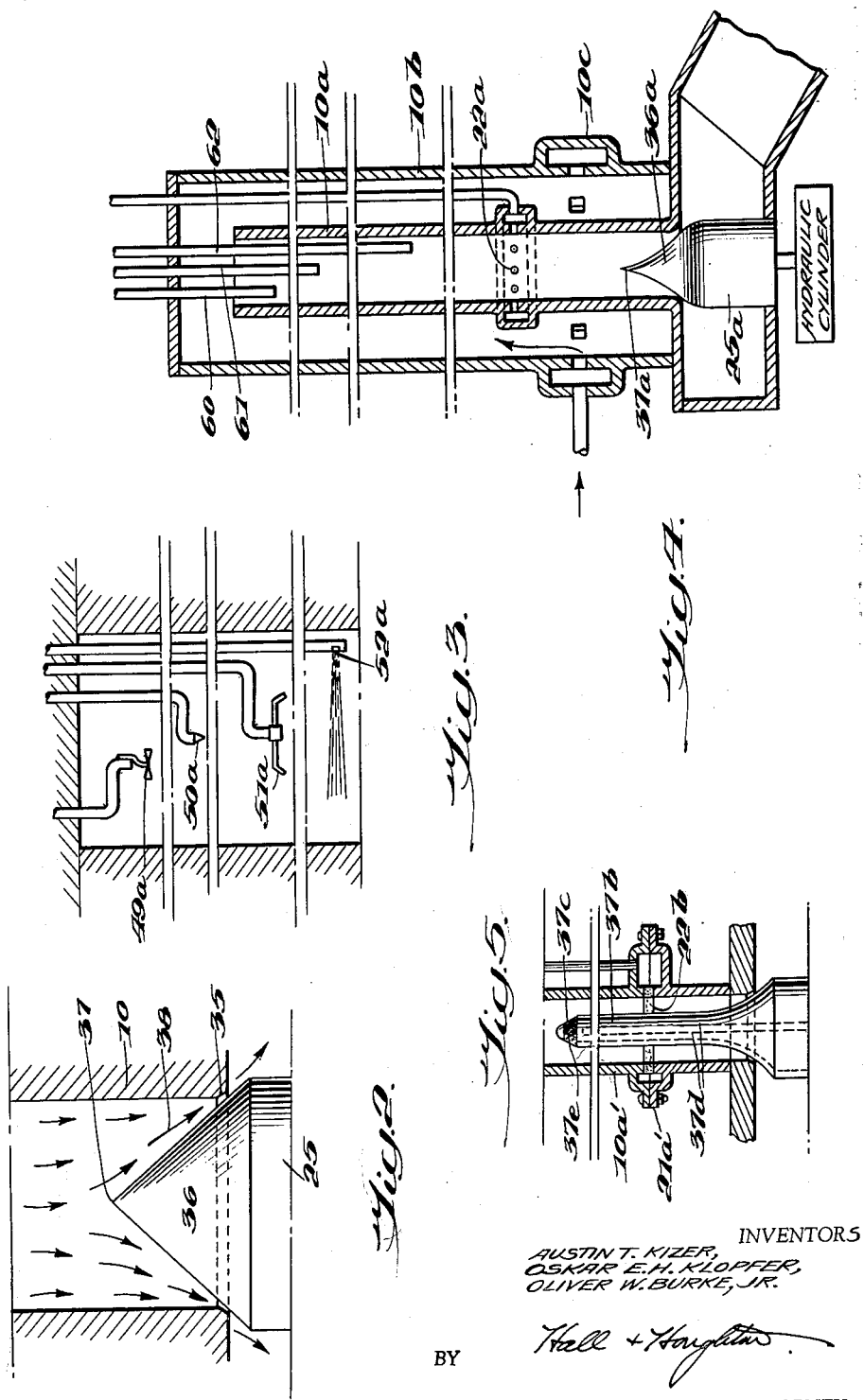

3,074,924
CONTINUOUS POLYMERIZATION PROCESS
Austin J. Kizer, Pontiac, Oskar E. H. Klopfer, Clawson, and Oliver W. Burke, Jr., Grosse Pointe Park, Mich., assignors, by mesne assignments, to Continental Oil Company, Ponca City, Okla., a corporation of Delaware
Filed Apr. 25, 1956, Ser. No. 580,655
5 Claims. (Cl. 260—95)

This invention relates to polymerization processes for the production of synthetic high molecular weight polymers with desired molecular orientation and the like, from monomers with polymerizable ethylene linkages and insoluble or partially insoluble catalysts, and aims generally to improve the same.

Among the objects of the invention, severally and interdependently, are to provide methods for the continuous polymerization of monomeric materials under conditions of non-turbulence or quiescent flow; methods for rendering the continuous polymerization chamber self-cleaning; methods for maintaining relatively non-turbulent the flow of the materials through the reaction zone; methods and means for continuously maintaining all materials in the reaction zone in liquid and solid phases while providing for continuous flow through such zone; methods for conducting the entire polymerization in a single continuous reactor; methods for the continuous production of polymers with the aid of metal-organic heterogeneous solid catalyst systems, and alkali metal catalyst materials; methods for continuously producing polymers modified by prepolymers or head polymers, the latter term meaning preparing polymer ahead of the principal polymer; methods for the continuous production of chain transfer modified polymer of relatively low dilute solution viscosity by rapid polymerization of the said organo-metal catalyzed type; methods for the rapid continuous production of shortstopped, and/or extender containing, and/or anti-oxidant containing polymers; and new and useful sub-combinations and steps contributing to the realization of various ones of the aforesaid more general objects; all as will become more apparent from the following detailed description of preferred embodiments of the invention.

The invention resides in the new and useful features, combinations, and sub-combinations of process herein described and is more particularly pointed out in the appended claims.

In the accompanying drawings of illustrative embodiments of the invention—

FIG. 1 is a diagram in elevation and section of a polymerization system embodying the invention.

FIGS. 2 and 3 are diagrammatic details in elevation and section of parts thereof.

FIG. 4 is a diagram in elevation and section of a modified form of reactor.

FIG. 5 is a diagrammatic detail in section and elevation illustrating further modifications that may be embodied in FIG. 1.

Alkali metal polymerizations of elastomers as heretofore practiced have generally been restricted to batchwise or semi-continuous alternate batchwise systems because of the long periods required to initiate polymerization and carry it to the desired conversion. It has been proposed to carry out such polymerizations in continuous tubes with the materials kept stirred up and advanced along the tubes by internal screw means, but such reactors have not been satisfactory because of the tendency of the sticky polymer to build up on the walls of the reactor and on the screw means, producing variable hold-up and consequent non-uniformity of the polymer, and ultimately complete clogging of the apparatus requiring that it be taken out of service for clean-out. Yet it was considered that such screw means were essential, both to distribute the heat of polymerization uniformly with the aim of avoiding formation of nodules in the polymer, and with the unattained aim of producing a uniform polymer.

The present invention departs from these preconceptions, and employs a combination of factors for rendering the reaction zone self-cleaning without reliance on screw means, and for maintaining substantial uniformity of polymer production notwithstanding that very active and rapid polymerization catalysts may be employed to obtain relatively high conversion of the polymerizing monomer material in times of the order of 5 to 15 minutes. The invention also enables complete control of the through-put time by the input of the ingredients of the recipe, and complete control of the pressure in the system by simple automatic means, in a manner to obviate the creation of any vapor phase in the reaction zone and effect other advantages.

Thus in the embodiment illustrated in FIG. 1 there is provided a tubular reaction chamber 10, preferably vertical and cylindrical. A chamber having a diameter of approximately 2½ inches and a length of approximately 10 feet has been found highly satisfactory where the polymer formed is high molecular weight and swells in the diluent and/or residual unpolymerized monomer employed, and with such a chamber self-cleaning has been attained despite a rate of flow therein of only about one foot per minute; whereas, with chambers having diameters of 6 inches to one foot, with exactly the same linear flow rate, though with a somewhat different discharge control valve, polymer build-up occurred on the walls of the chamber to a depth of an inch or more and so clogged the system that it had to be taken down for cleaning.

In the embodiment shown in FIG. 1 suitable means are provided for the introduction of the ingredients of the polymerization recipe into the chamber 10, preferably in the order shown by this invention to be most advantageous for effecting a smooth, rapid, and economical polymerization to obtain polymers and elastomers of a nature suitable for processing. Each of these ingredients —which include a diluent or solvent, a catalyst material for polymerization, optionally a preformed polymer and other ingredients including those to prepare polar modified hydrocarbon polymers according to a joint copending U.S. patent application of O. E. H. Klopfer and O. W. Burke, Jr., Serial No. 580,642, filed April 25, 1956, now abandoned, entitled "Conjunctive Polymers, and Methods and Catalyst Systems for the Preparation Thereof," the monomer or monomers to be polymerized, optionally a modifier to enable the practice of the joint invention of Paul Davis and O. E. H. Klopfer disclosed and claimed in the copending U.S. patent application Serial No. 694,742, filed November 6, 1957, entitled "Regulation of Polymerization Catalyzed by Organo Metal Materials," and optionally a shortstopping agent and/or extender and/or antioxidant with or without solvent—is fed to the appropriate level of the chamber 10, preferably by positive displacement pump means giving accurate control of the rate of feed.

The upper end of the tubular chamber 10 is closed in any suitable way, and at the lower end of the chamber a pressure controlled discharge valve is provided that can discharge the formed polymer at a rate corresponding to the rate of input of the ingredients while maintaining a pressure in the chamber sufficient to prevent the occurrence of a gaseous phase therein. This valve means, as will be hereinafter described, is peculiarly constructed to cooperate in a novel manner with the tubular chamber and with the polymer being discharged so as to aid the self-cleaning of the reactor 10. The means illustrated in FIG. 1 for storing and feeding each of the essential and optional ingredients will now be described.

The solvent or diluent, e.g., pentane, is stored in tank means 11 which delivers it through a dryer and cooler or other heat exchanger, depending on the volatility of the solvent, to a manifold 12. Positive displacement pumps P1, P2, P3 and P4—which, like other such pumps described herein, may be of the reciprocating piston, diaphragm or other types of pumps and are preferably separately driven by variable speed motor means at accurately adjustable speeds—can supply the solvent or diluent as an ingredient entering the polymerization chamber 10, preferably with one or more of the other ingredients, herein by delivering the solvent selectively to the feed pipes for such other ingredients. At the start of an operation, as hereinafter described, the solvent is preferably supplied alone to fill the chamber 10 prior to the initiation of polymerization therein. Catalysts can be used which are at least in part insoluble to obtain polymers with desired molecular weight and orientation and such catalysts include organo-metallic catalyst systems with or without substrate (insoluble portion) and with or without soluble portions, or the fore mentioned catalyst systems include organo-metallic compounds in combinations, or alkali metals may be used per se or in combination providing such are sufficiently finely dispersed to yield high molecular weight polymers. The catalyst substrate may be a metal or a metal salt, or a metal salt complex, an insoluble organo-metallic compound and combinations of such with metallic salts and salt complexes, or mixtures of the aforesaid and such may be either of synthetic or natural origin, including petroleum dehydrogenation and cracking catalysts and the like with or without activation, or an organic compound insoluble in the monomers or diluents used including polymers and cross-linked polymers and carbon in various forms including carbon from thoermally decomposed polymers and cross-linking polymers. The catalyst referred to herein to exemplify the invention, is an organic alkali metal catalyst or "Alfin" type catalyst having finely divided solid particles and a soluble organic metal component in a fluid carrier. This pumpable catalyst in tank means 13, which is provided with any suitable means for maintaining the catalyst in suspension, exemplified by a recirculating pump P5 for continuously agitating the contents of the catalyst storage tank 13, is drawn from the storage tank 13 by a positive displacement pump P6 and fed, with such diluent as may be supplied from pump P1, to the upper end of the solvent filled chamber 10. Especially when fed with volatile solvent previously chilled to avoid cavitation in the pumps P1–P4, the catalyst feed to the upper end of the reactor chamber may be passed through a pre-heater of any conventional form, for the purposes hereinafter described, that may also be used for pre-heating the diluent supplied by the diluent pump P1.

When a prepared catalyst is not used then the catalyst material can be prepared in situ or shortly before entering the reactor. In such case the soluble catalyst component may be drawn from tank means 13A by positive displacement pump means P13 and the insoluble catalyst component in a fluid carrier (above described) may be drawn from suitable tank means 13B (that may be provided with agitator means like tank means 13) by positive displacement pump means P14 and be combined before entering the reaction chamber 10 at 49 or on entering the reaction chamber. In addition the soluble catalyst component from tank 13A with or without additional monomer of the same type or different type (see copending application Serial No. 580,642, filed April 25, 1956, now abandoned, entitled "Conjunctive Polymers, and Methods and Catalyst Systems for the Preparation Thereof") may be drawn from a supply 15A as by positive displacement pump means P15, and be added through a second inlet 52 placed further along the reaction chamber 10.

If desired a prepolymer of the type described in my above mentioned copending application, which may be of liquid form, or in the form of a soluble polymer dissolved in a solvent and which may contain residual or added monomer materials, may be delivered from a supply 14 by positive displacement pump P7, with a measured quantity of solvent from pump P2, to the upper end of the chamber 10 to disperse in the catalyst solvent suspension introduced by pumps P6 and P1. When necessary a dryer may be provided in the head-polymer feed lines, with by-pass valves, as shown, and when volatile solvent or monomer is present the fluid may be cooled by a heat exchanger before delivery to the pump P7 as shown. The effluent from either or both of pumps P2 and P7 may be pre-heated as shown, on its way to the chamber 10.

The monomers used in which the catalyst materials are completely or at least partially insoluble and for which this polymerization system and apparatus was discovered to produce high molecular weight polymers with desired molecular orientation, are monomers containings one or more polymerizable ethylene groups and which include the hydrocarbon olefins such as ethylene, propylene, the butylenes and higher homologues; the hydrocarbon vinyl such as styrene and hydrocarbon substituted vinyls such as the vinyl toluenes, the dimethyl styrenes, the ethyl and diethyl styrenes, and the like and α-methyl styrene; the dienes such as butadiene, isoprene, dimethyl butadiene, and like dienes including the higher homologues. Polymerizable compounds with one or more ethylenic double bonds which have hydrogen substituted by polar groups can be used when such polar groups do not adversely effect the polymerization.

These monomers containing one or more polymerizable ethylene groups can be used individually or in combination providing such can be polymerized to high molecular weight polymers with oriented structures and such polymers may be insoluble in their monomers or the diluents employed or may be partially soluble, swellable or completely soluble in such monomers or diluents and it is this latter case for which this system was discovered and is particularly useful and therefore such soluble high molecular weight polymers are exemplified hereinafter.

The main monomer or monomers to be polymerized in the reactor 10 may be stored in one or more tanks 15, and be delivered by one or more positive displacement pumps P8, with any diluent added from pump P3, at measured rates to the reactor 10. The usual dryer and heat exchanger for chilling volatile monomers may precede each pump P8, and the effluent therefrom with solvent from pump or pumps P3, may be passed through pre-heater means on its way to the chanber 10.

Provision is made for separately delivering parts of the monomer material from tank or tanks 15 and/or 15A to different levels in the chamber 10, and for adding modifier material to that monomer material introduced at the lower level therein, for the purpose hereinafter described, such means in the form shown, being exemplified by the manifold 16 having separate delivery branches controlled by valves 17 and 18 respectively, and communicating in that order with the interior of the upper part of the chamber 10, there being a main polymer modifier solution stored in a tank 19 from which it is deliverable, at measured rate, with added solvent if desired from pump P4, to the branch controlled by valve 18, through a pre-heater as shown, if desired.

The polymer may be multiply metallated by introducing a metallating agent into chamber 10 through a tube port 22A via manifold 21A being pumped by pump 10A from tank 20A. The metal of the metallated polymer may be replaced by a polar group by introducing into chamber 10 through a tube or port 22B via manifold 21A being pumped by pump 10B from tank 20B a reactive metal-displacing polar compound. The various materials which may be employed for metallation and stored in tank 20A and the metal-displacing materials stored in tank 20B are fully described in the copending U.S. patent application Serial No. 580,642, filed April 25, 1956, by Oskar E. H. Klopfer and Oliver W. Burke, Jr., entitled "Conjunctive Polymers, and Methods and Catalyst Systems for the Preperation Thereof."

Finally, a shortstopping agent and/or an extender and/or an antioxidant, with or without solvent, may be stored in tank means 20, and be delivered by positive displacement pump means P10 to the lower end of the chamber 10, at a level at which the desired conversion has been obtained.

As shown, the various polymerization recipe ingredients are delivered to the appropriate levels in the reactor through drop tubes passing inwardly through the top of the chamber, and extending through the region at which the polymer concentration is low. Such an arrangement is desirable for simplicity and to provide for easily changing the levels at which the several ingredients are to be introduced, for adapting the apparatus to perform desired polymerizations in accordance with the best procedure for the particular recipe concerned, but it will be understood that the ingredients may be introduced in other ways, one of which is shown employed as a means of introducing the shortstopping agent and/or extender and/or antioxidant from pump means P10.

This latter arrangement comprises several introductor pipes or manifolds 21, 21A, 21B formed integrally with or secured to the outside of the chamber 10 in pressure tight fashion, and communicating with the chamber, preferably through a plurality of ports 22, 22A, 22B spaced relatively uniformly thereabout or the chamber may be divided and provided with a porous ring insert 22b as shown in FIG. 5, such insert being made from sintered metal powder and the manifold 21a being placed thereover. While the shortstop and/or extender and/or antioxidant material may be otherwise introduced, or even be applied to the polymer after it leaves the chamber 10, the arrangement shown is particularly advantageous. For one thing, as the desired conversion has been attained at the lower end of the chamber 10 at which the polymer control agent ports 22 or equivalent are located, the chamber at that level contains sticky solid polymer dispersed in and swollen with a considerable quantity of solvent and unreacted monomer. Such polymer has a tendency to adhere to the walls of the chamber 10, and if it does so and is by-passed, it may be subjected to additional polymerization. The liquid polymer control agent such as extender and/or shortstop agent and/or antioxidant with or without solvent entering through the ports 22 tends to force itself between any adhering polymer and the walls thereat and thus to break loose any adhering polymer from the walls. Further, the introduction of the shortstopping agent at this region at which the tendency for adhesion to the walls is greatest, stops the polymerization reaction thereat. Furthermore, the introduction of the oily extender also tends to reduce adhesion of the polymer to the walls. Finally, the introduction of the shortstopping agent and extender at this point assures a uniform mixing and homogenizing thereof with the polymer as the latter is extruding through the polymer delivery valve, the preferred form of which will now be more fully described.

As shown in FIGS. 1 and 2, the pressurizing and polymer delivery valve comprises a valve head 25 carried by a valve stem 26 that is supported by the movable elements of a hydraulic cylinder 27, supplied with hydraulic fluid from a storage reservoir 28 at pre-determined pressure (that may be indicated by a gauge 29) by means of a pump $P_A$ (that may be manually or automatically put into operation when the pressure at the delivery side of the pump falls below a pre-determined level). An accumulator 30 of any suitable type (shown as a pressure tank having liquid and gas chambers therein separated by a flexible bag 31 and provided with a valved inlet 32 for adjusting the gas pressure and a connection from its liquid chamber to the hydraulic pressure system) provides for limited opening and closing of the valve 25 as the polymer pressure forces it backward against the hydraulic pressure and vice versa.

As best shown in FIG. 2 the valve head 25 cooperates with a valve seat at 35 that preferably has a diameter equal to the inside diameter of the tube 10, and the valve seat 25 preferably has a conical seating surface 36 that extends to a relatively sharp point 37 well above the valve seat 35 and centrally of the tube 10. The hydraulic pressure applied to the area of the valve seat 35 (FIG. 1) is such as to prevent formation of gas phase in chamber 10.

When polymer is being formed in the chamber 10 and is being forced through the valve 25 at a rate corresponding to the rate of pumping of the ingredients as reduced by the slight shrinkage accompanying polymerization, when the polymer itself is swollen with volatile monomer and solvents, and as it issues through the valve seat 35, it is subjected to a reduction of pressure that causes it to violently expand. The expansion in a sense tends to increase the velocity head through the valve while the semi-solid nature of the polymer tends to hold the valve open somewhat.

Factors that aid in preventing the polymer from sticking to the walls of the chamber 10 are the location and size of the valve seat 35 and the shape of the seating surface 36 with its apex 37 considerably above the valve seat. As noted, the polymer even when swollen with monomer and solvent has some cohesiveness, and it appears that when the body of polymer is symmetrically divided by the sharp tip 37, the polymer violently forced out of the valve seat 35 as its volatiles expand it, is able because of this cohesiveness to pull the following polymer down into the smooth walled tapering headstock 38 defined by the conical tip 36 and the cylindrical inner wall of the chamber 10, as indicated by the arrows in FIG. 2. Apparently the cohesiveness is not much greater than the tendency of the polymer to adhere to the walls, at least in the absence of extender introduction through the ports 22, because when a valve is employed that involves a sharp change of direction on approach to the valve seat, there seems to be a greater tendency of the polymer to build-up on the walls.

As shown in FIG. 2, the valve seat 35 is preferably formed by slightly chamferring or countersinking the edge of the reaction tube or fitting forming the lower end thereof, on a conical angle. The angle chosen is preferably slightly different than the angle of the conical seating surface 36 that closes against the seat 35. This provision affords a line-contact between the valve and valve seat and facilitates the obtaining of a good fit. As shown in FIG. 2, the conic-angle of the part 36 is preferably somewhat blunter than that of the seat 35, so that the resulting wedge-like space at the valve seat flares upwardly toward and forms a narrowing continuation of the smooth walled headstock area 38.

Another aid to rendering the reactor self-cleaning contemplated in the present invention is to provide the inner walls of the chamber 10, and preferably also the walls of the valve portion 36, with means for reducing the tendency of the polymer to adhere thereto, herein exemplified by a mirror finish of said walls, or by lining or coating the said walls with an anti-sticking agent such as an amalgamation of mercury thereto, or a plating of cadmium thereon.

A further provision for aiding in rendering the reactor self-cleaning, and which has other advantages hereinafter described, resides in the stepwise addition of the monomer materials, tending to maintain more dilute concentrations of polymer throughout all but the lower portions of the tube where the formation of the final viscous semi-solid swollen polymer can be best subjected to the cohesive pull of the polymer issuing through the valve, to the freeing action of the extender, when used, and to the pressure fluctuations occurring above the valve.

Also another factor that assists in preventing adhesion of the polymer to the tube walls and in obtaining uniformity of product when employing the vertically arranged embodiments of the present invention, is the fact that gravity acts on the polymer and catalyst in the direction to keep it moving along the tube, rather than in a direction tending to deposit catalyst, hence polymer, against a side wall of the tube as in the case when such is not vertical.

Mention has been made above of the fact that the development of viscous sticky semi-solid polymer is restricted to the lower portion of the ractor 10; also as the polymer concentration increases it becomes more and more desirable to conduct the polymerization in a quiescent manner, because turbulence when the polymer concentration becomes relatively high tends to produce polymer of much higher molecular weight and dilute solution viscosity then when quiescent conditions are maintained.

For example, polymerizations run under identical conditions with the same organo-alkali metal catalyst, except that one was agitated to give turbulence throughout the polymerization period (10 minutes) while the other was agitated only during the first minute and quiescent the rest of the time, produced substantially the same yield of polymer, but the quiescent polymer was homogeneous in appearance while the other was not and the quiescent polymer when oil-extended (85 pts. on 100) had a Mooney viscosity of 44 ML-4, while the agitation polymer with the same extension had a Mooney of over 200 ML-4 and sheared in the Mooney viscometer.

However, it is desirable that the polymerization recipe ingredients be very uniformly dispersed to obtain a homogeneous polymer. The present invention may achieve both these ends by producing local mixing turbulence at the points of introduction of the polymer forming ingredients, which points are located at regions at which the polymer concentration is very low or nil. Any suitable means may be employed for producing such local mixing. In FIG. 1, for example, the head polymer inlet 50 to chamber 10 is shown as of jet-form to jet that solution at high dispersing velocity into the descending catalyst suspension in which the catalyst is also settling, thus to thoroughly disperse the head polymer therein. Again, the first main monomer inlet is shown as provided with a spinner agitator 51, that is rotated by the narrow stream or jet issuing there against, and sprays the monomer solution fan-wise across the cross-section of the reactor. Where only a small part of the monomer is introduced at the first monomer inlet, the concentration of polymer at the level of the second monomer inlet is so low that turbulence thereat is not serious, and a mixing means such as spinner 52 may be used to mix the latter monomers uniformly into the descending reaction medium. Since the reaction zone is relatively narrow compared to its length, the flow of the material below the mixing means 52 quickly becomes laminar and quiescent and remains so throughout the regions in which the polymer concentration becomes high.

As is made clear by FIGS. 1 and 3, any form of mixing device may be associated with each of the inlets, those shown in FIG. 3 comprising a spinner 49a associated with the catalyst inlet, a jet 50a with the head polymer inlet, a rotary jet sprayer 51a associated with the first monomer inlet, and a transverse jet 52a associated with the second monomer inlet, and latter being shown as arranged near one side of the tube 10 with a horizontal slot discharging fanwise across the tube.

The step-wise introduction of the monomer material as at levels 51 and 52 is advantageous whether or not the second added monomer contains modifier. It effects economy of catalyst by restricting the access of monomer carried impurities thereto until the initiation of polymerization has provided some polymer to aid in protecting the catalyst from such impurities. It also enables the polymerization to be initiated with one monomer, and to then be continued with a different monomer, for example.

Still referring to FIG. 1, the polymer issuing from the valve seat 35 preferably passes through a sealed casing 40 into a sealed housing 41, in which the polymer if not shortstopped may further polymerize, and with its volatiles, and its extender and/or shortstopping and/or antioxidant agent, if previously added, is deposited in suitable conveying means, illustrated as a perforated container or car 42 resting on a bed of spaced rods 43. A suitable gas, such as carbon dioxide in connection with organo-alkali metal catalysts, may be circulated through the chamber to kill any remaining catalyst. From the chamber 41 the volatiles are withdrawn, as through a conduit 45 (with the circulated $CO_2$), for recovery. The chamber 41 and recovery duct 45 may be maintained under slight subatmospheric pressure if desired to prevent leakage of combustible gases.

It will be appreciated that as the polymer enters the headstock 38 of the valve and is spread outwardly into a thinner and thinner body, finally extruding through the valve opening of only a fraction of a millimeter or so width, the shortstopping agent and/or extender and/or antioxidant, if entered through the ports 22, is quite intimately and uniformly distributed through the swollen polymer mass, and remains therewith when the mass is blown up into thin films by the violent expansion of its volatiles. Thus while in the broader aspects of the invention the polymer may be shortstopped and/or treated with extender and/or antioxidant solution, or both, in the passage 40 or housing 41, the introduction of these agents at the level of the ports 22 is preferred.

The embodiments of the apparatus illustrated in FIG. 4 embodies substantially the same principles and may be employed with feed and hydraulic equipment similar to that shown in FIG. 1. The features shown in this embodiment are ones that may be employed in the embodiment of FIG. 1. In this embodiment the reaction zone of the tube 10a is cooled by the catalyst suspension passing upwardly in the jacket 10b from the manifold or inlet 10c, thus pre-heating the solvent-catalyst dispersion. The tube jacket 10b in this instance is closed at its top and delivers the warmed solvent and catalyst suspension to the top of the reaction tube 10a. In this embodiment the jacket is carried down to the valve seat area, where cooling occurs from the rapid expansion of the extruding polymer. Thus in this zone the jacketing aids in maintaining more constant temperature for producing more uniform operation of the discharge valve. Further heating or cooling may be employed at local portion of the reactor, as thus exemplified. The other polymerization ingredients are delivered into the tube as above described, by ducts 60, 61 and 62, respectively, and in this instance the extender and/or shortstopping agent and/or antioxidant, is jetted forcibly into the polymer near the lower end of the tube as by supplying it under high pressure to a series of fine jet-like apertures 22a in the tube wall. The valve 25a is similar to the valve of FIG. 1 but its generally conical headstock portion 36a is somewhat more streamlined and is provided with a sharper polymer dividing point 37a.

Just as the surface 36a is smoothed and rendered more streamlined in this form without departing from the principles set forth in connection with FIG. 2, so the valve seat (35, FIG. 2) may have its edges, and especially its upper edge, smoothed and rounded without loss of the substantially line contact above mentioned.

The conical valve end tip 37a, FIG. 4, can be extended as a small diameter rod or hollow tube far up into the reactor chamber as illustrated at 37b in FIG. 5. This is especially useful in case where the resulting high molecular weight polymer only swells slightly in its monomers or diluent and in such cases the hollow tube is closed and preferably with a cone shaped tip 37c at the upper end and a fluid may be circulated therethrough via riser and return ducts 37d, thus providing heat exchange with the polymerizing mass and thus permitting chambers with larger cross-section to be used for the reactor. Further an alternative also especially suitable only in the case of low solubility polymers is the insertion of the cooling tube that may be of the same spur type from the end opposite from the conical valve in a central location such as that illustrated at 61 in FIG. 4.

As will further be apparent from FIGS. 4 and 5, just as one or more of the materials being fed to the reaction chamber 10a may pass in heat exchange relation thereto in an external jacket 10b, so a material being fed to the reaction chamber 10a' may pass in heat exchange relation thereto through the central tube 37b and be introduced into the chamber via port means such as the porous metal ring cap 37e. Where such material is a polymer control material introduced approximately at the level of port means 22b, it may also tend to prevent the sticking of polymer to the sides of the tube 37b as explained in connection with the material introduced through the port means 22 and 22a.

To aid in control of polymerization and prevention of sticking of polymer to the chamber walls, especially where the use of larger cross-section reaction chambers is desirable, the reaction chamber can be vibrated by suitable mechanical or mechanical-electrical means, however, turbulence and agitation should be avoided.

Features of the continuous polymerization process substantially without turbulence that the above described apparatus is particularly designed to carry out, have been referred to in part during the description of the apparatus. Such features include severally and in mutual cooperation, the conduction of the mass polymerization with organo-metallic catalysts, heterogeneous organo-metallic catalyst and alkali metal catalysts with or without substrate, with or without soluble portions, in a diluent or solvent stream; the flowing of such stream through an elongated cylindrical reaction zone; the introducing into such stream, seriatim, of the organo-metallic polymerization catalyst system, the preformed polymer, when used, and preferably an initial minor proportion of monomer material to be polymerized; the introduction into the stream of the principal part of the monomer material to be polymerized, and of modifier material; the introduction of the above mentioned components may be accompanied with local turbulence to effect uniform mixing, which however, due to the elongated narrow reaction zone, is soon damped out so that the polymerization of the monomer material is substantially entirely effected under quiescent conditions; the flowing of the stream helps the polymer to move along with the stream and not adhere to the tube walls, and so that the catalyst particle does not settle in the liquid reactant and diluent medium, and thus maintains a uniform catalyst distribution throughout the cross-section of the stream; the dividing of the polymer stream centrally, and the smooth guidance of it longitudinally and toward the periphery of the cylindrical zone, and its discharge substantially longitudinally from the periphery of such zone, so that cohesive forces of the polymer, as leading polymer issues through the peripheral outlet, may act directly to draw following polymer toward such peripheral outlet without such forces being dissipated by snubbing action due to any sharp turns or other tension augmenting condition in the headstock area leading to the peripheral discharge outlet; the introductions of a polymer controlling agent, preferably peripherally of the cylindrical stream, at that point at which the polymerization to a viscous, sticky solid has been substantially completed, and where it will be intimately mixed with the polymer being ejected in a thin sheet peripherally of the reaction zone before the sheet undergoes violent expansion from the release of pressure therein; the employment of further means for rendering the process self-cleaning, such as conducting it in a zone bounded by a wall that is treated to repel adhesion, and the inclusion in the polymer controlling material of a shortstopping agent, to cut off polymerization at the region at which adhesion becomes most difficult to control, or of an oily extender that aids in preventing sticking and is itself intimately mixed with the polymer as it is attenuated in the thin sheet for discharge; the the introduction of antioxidant material with the shortstopping agent to also be intimately admixed in the same advantageous manner; the discharge of the polymer into a closed chamber kept cold with circulated gas from solid carbon dioxide or any other low temperatures source, to reduce loss of volatiles and at the same time kill the remaining catalyst in the polymer; the withdrawal of the volatiles from the discharge polymer under sub-atmospheric pressure, to most effectively strip the polymer, prevent leakage, and promote efficient recovery of solvents and other unreacted materials.

The mode of monomer introduction in the present process is particularly advantageous, as it facilitates the use of polymerization modifiers that act as chain transfer agents (for example, mercaptans and organic halides capable of dissociating to form free radicals) that can only be introduced when polymer is present to protect the catalyst from reacting with such regulating chain transfer agents to produce products that would not initiate the formation or termination of polymer chains. The introduction of the preformed polymer and its thorough admixture with the catalyst, in that adaptation of the present continuous process, also protects the catalyst from reacting with deactivating materials and facilitates the smooth running and control of the rapid, hard to control polymerization systems, e.g., Alfin type polymerizations. This whole apparatus system can be employed as a primary polymerizing stage if so desired.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

We claim:

1. A single pass continuous polymerization method which comprises: establishing a longitudinally flowing elongated cylindrical stream of non-aqueous liquid diluent; introducing into said stream a polymerization catalyst; dispersing in said stream monomer material polymerizable by said catalyst; conducting the polymerization in an extended region of said stream which is maintained free of agitation and in substantially non-turbulent laminar flow so that the cylindrical stream near the end of said extended region comprises a longitudinally flowing body of polymer; diverting the inner portions of said body of polymer progressively outwardly toward the periphery of said cylindrical stream as said body flows longitudinally therein; and progressively discharging the resulting longitudinally moving thin annular body of polymer and diluent from the outer periphery of said cylindrical stream.

2. A method according to claim 1, further including the feeding of a preformed polymer solution into said liquid diluent stream ahead of the monomer material to be polymerized therein.

3. A single pass continuous polymerization method which comprises: establishing a longitudinally flowing elongated cylindrical stream of non-aqueous liquid diluent under a constantly maintained pressure, suspending in said stream a polymerization catalyst, dispersing in said stream monomer material polymerizable by said catalyst, maintaining said pressurized flowing stream free of agitation and in substantially non-turbulent laminar flow while said catalyst effects polymerization of said monomer material, so that the cylindrical stream near the end of said extended region comprises a longitudinally flowing body of polymer; diverting the inner portions of said body of polymer progressively outwardly toward the periphery of said cylindrical stream as said body flows longitudinally therein; and employing said constantly maintained pressure for progressively discharging the resulting longitudinally moving thin annular body of polymer and diluent from the outer periphery of said cylindrical stream.

4. A method according to claim 3, in which a polymer controlling agent selected from the group consisting of short stop agents, antioxidants and extenders is introduced peripherally of said stream in a region proximate to the region at which the polymer is diverted, so as to become intimately mixed with the polymer as such is reduced to, and discharged as, a thin annular body.

5. A method according to claim 3, in which said stream comprises liquified gaseous material and in which the thin annular body of polymer is discharged into a body of cold circulating gas of reduced pressure so that the expansion of the gaseous material expands the polymer into thin films to facilitate release of volatiles to such cold gas for recovery.

References Cited in the file of this patent

UNITED STATES PATENTS

| | | |
|---|---|---|
| 980,624 | Gale | Jan. 3, 1911 |
| 2,004,423 | Warren | June 11, 1935 |
| 2,290,177 | Grant | July 21, 1942 |
| 2,394,291 | Calcott | Feb. 5, 1946 |
| 2,395,079 | Sparks et al. | Feb. 19, 1946 |
| 2,399,560 | Murphree | Apr. 30, 1946 |
| 2,530,144 | Bannon | Nov. 14, 1950 |
| 2,566,537 | Schmerling | Sept. 4, 1951 |
| 2,617,718 | Miller | Nov. 11, 1952 |
| 2,710,854 | Seelig | June 14, 1955 |
| 2,728,754 | Evering | Dec. 27, 1955 |
| 2,731,081 | Mayner | Jan. 17, 1956 |
| 2,820,779 | Dale | Jan. 21, 1958 |
| 2,843,577 | Friedlander | July 15, 1958 |
| 2,882,264 | Barnes et al. | Apr. 14, 1959 |
| 2,885,389 | Schappert | May 5, 1959 |
| 2,887,471 | Shearer et al. | May 19, 1959 |

FOREIGN PATENTS

| | | |
|---|---|---|
| 319,588 | Great Britain | Mar. 23, 1931 |

OTHER REFERENCES

Dunlop et al.: Industrial and Eng. Chem., vol. 40, No. 4, April 1948, pp. 654–660; pp. 655–656 only needed.

"Chem. Eng. Handbook" (Perry), 3rd edition, Published by McGraw-Hill (1949), page 375.

UNITED STATES PATENT OFFICE
CERTIFICATE OF CORRECTION

Patent No. 3,074,924

January 22, 1963

Austin J. Kizer et al.

It is hereby certified that error appears in the above numbered patent requiring correction and that the said Letters Patent should read as corrected below.

Column 4, line 24, for "containings" read -- containing --; column 7, line 17, for "ractor" read -- reactor --; column 8, line 54, for "portion" read -- portions --.

Signed and sealed this 10th day of September 1963.

(SEAL)
Attest:

ERNEST W. SWIDER
Attesting Officer

DAVID L. LADD

Commissioner of Patents